United States Patent [19]
Takahashi et al.

[11] Patent Number: 5,474,962
[45] Date of Patent: Dec. 12, 1995

[54] POWDER CATALYST COMPOSITION AND PROCESS FOR POLYMERIZING OLEFINS WITH THE USE THEREOF

[75] Inventors: Tadashi Takahashi; Kazuhiro Yamamoto; Katsumi Hirakawa, all of Yokkaichi, Japan

[73] Assignee: Mitsubishi Petrochemical Company Limited, Tokyo, Japan

[21] Appl. No.: 124,753

[22] Filed: Sep. 22, 1993

[30] Foreign Application Priority Data

Sep. 22, 1992 [JP] Japan ................... 4-253053

[51] Int. Cl.⁶ ................................. B01J 31/00
[52] U.S. Cl. .................. 502/129; 502/103; 502/117; 502/113; 502/120; 502/152; 502/153
[58] Field of Search ................... 502/129, 103, 502/117, 113, 120, 152, 155

[56] References Cited

U.S. PATENT DOCUMENTS

| | | | |
|---|---|---|---|
| 4,808,561 | 2/1989 | Welborn, Jr. ............... | 502/104 |
| 4,931,517 | 6/1990 | Fujita . | |
| 5,026,797 | 6/1991 | Takahashi . | |
| 5,122,584 | 6/1992 | Takahashi . | |
| 5,126,301 | 6/1992 | Tsutsui et al. ............. | 502/103 |
| 5,214,114 | 5/1993 | Takahashi et al. . | |
| 5,308,811 | 5/1994 | Suga et al. ................ | 502/103 |

FOREIGN PATENT DOCUMENTS

| | | | |
|---|---|---|---|
| 0133383 | 2/1985 | European Pat. Off. . | |
| 0361866 | 4/1990 | European Pat. Off. . | |
| 427696 | 5/1991 | European Pat. Off. ........ | 502/103 |
| 1332778 | 6/1963 | France . | |

*Primary Examiner*—Asok Pal
*Attorney, Agent, or Firm*—Oblon, Spivak, McClelland, Maier & Neustadt

[57] ABSTRACT

The present invention provides a powder catalyst composition for producing by gas-phase polymerization olefin polymers having excellent polymer qualities and good particle properties in a high yield.

The powder catalyst composition comprises fine particles of the following Component (B) coated with the following Component (A), and is characterized in that the ratio of the Component (A) to the Component (B) based on percent by weight ranges from 5:50 to 95:50: Component (A): an inorganic compound in the form of fine particles having an average particle diameter of 0,003–1 μm and mainly comprising an inorganic oxide, and Component (B): a solution or dispersion in a hydrocarbon of the following Sub-components (i) and (ii): Sub-component (i): a compound of a transition metal belonging to the IVB group of the Periodic Table, and Sub-component (ii): an alumoxane, a Lewis acid, or an ionic compound which can convert the Sub-component (i) upon reaction therewith into a cation.

A process for polymerizing an olefin with use of the composition is also disclosed.

11 Claims, No Drawings

POWDER CATALYST COMPOSITION AND PROCESS FOR POLYMERIZING OLEFINS WITH THE USE THEREOF

BACKGROUND OF THE INVENTION

1. Field of the Art

The present invention relates to polymerization of olefins. Particularly, the present invention relates to a novel catalyst composition and a process for preparing an olefin with the use of the catalyst. More particularly, the present invention relates to a process for polymerizing an olefin in which an olefin polymer having excellent particle properties can be prepared when the slurry polymerization method or the vapor phase polymerization method, particularly the vapor phase polymerization method, is employed, and in which an olefin copolymer having a narrow molecular weight distribution and a narrow composition distribution can be prepared with an excellent polymerization activity, and further in which a polymer which will produce a film product having an excellent appearance can be produced.

2. Background Art

Processes for preparing an ethylene-α-olefin copolymer with catalysts comprising a zirconium compound and an alumoxane as a novel Ziegler type catalyst are disclosed in, for example, Japanese Patent Laid-Open Publication Nos. 19309/1983, 35006/1985, 35007/1985, 35008/1985, 130604/1985, and 260602/1985.

The catalysts formed with the transition metal compound and the alumoxane as proposed in the prior techniques, notwithstanding their extensively excellent polymerization activities as compared with conventional Ziegler catalyst systems comprising a transition metal compound and an organoaluminum compound, were accompanied by certain problems. For example, the nature of the catalysts such that most of the catalyst systems proposed in the prior art are soluble in the polymerization system may favor their use in solution polymerization whereby not only there may be substantially no polymerization methods other than a solution polymerization method, but also the polymer solutions which are usual forms of a polymer produced in the solution polymerization have excessively high viscosity where the polymer has a high molecular weight. Moreover, the polymers obtained from the solution had only a low bulk density, so that it was also difficult to obtain a polymer having good particle properties.

Trials for polymerizing olefins by a suspension polymerization method or a vapor/gas phase polymerization method in the presence of a catalyst having one or both of the components of the transition metal compound and the alumoxane described above supported on a porous inorganic oxide carrier such as silica, silica-alumina or alumina have been performed. For example, it has been described in Japanese Patent Laid-Open Publication Nos. 35006/1985, 35007/1985 and 35008/1985 that the transition metal and the alumoxane supported on a carrier such as silica, silica-alumina or alumina can be used as a solid catalyst.

Additionally, Japanese Patent Laid-Open Publication Nos. 106808/1985 and 106809/1985 disclose a method for preparing a composition comprising a polyethylene polymer and a filler by copolymerizing ethylene or ethylene and an α-olefin in the presence of a product which has been obtained by the preliminary contact of an active catalyst comprising a hydrocarbon-soluble titanium and/or zirconium compound with a filler, and an organoaluminum compound as well as an additional filler which has an affinity for a polyolefin.

Further, a method of copolymerizing ethylene or ethylene and an α-olefin in the presence of a catalyst mixture comprising a product obtained by reacting a trialkylaluminum and water in the presence of silicon dioxide and aluminum oxide and a transition metal compound has been described in Japanese Patent Laid-Open Publication No. 31404/1986.

Japanese Laid-Open Publication No. 276805/1986 discloses a method of polymerizing an olefin in the presence of a catalyst comprising a zirconium compound and a reaction mixture of an alumoxane with a trialkylaluminum which are further reacted with an inorganic oxide having hydroxyl groups on the surface of the inorganic oxide such as silica.

Furthermore, a method of polymerizing an olefin in the presence of a catalyst having a transition metal compound such as a metallocene and an alumoxane supported on a carrier such as an inorganic oxide has been described in Japanese Laid-Open Publication Nos. 108610/1986 and 296008/1986.

To the best of our knowledge, the use of such catalysts comprising a transition metal compound and an alumoxane supported on a carrier as those disclosed produce polymers having lower granulometric properties such as a lower bulk density in a lower yield when the catalysts are used in a suspension or a gas phase polymerization than when they are used in a solution polymerization method. Additionally, these inorganic compounds used as the carrier remain in the polymers produced often to impair the physical properties or appearances of film products produced therefrom.

It has been described in Japanese Patent Laid-Open Publication Nos. 280703/1988 and 11604/1992 that polymers having a polymerization activity and a good particle property can be obtained even with only a small amount of an alumoxane when use is made of a transition metal component which has undergone a preliminary polymerization in the presence of a carrier/support material which has been treated with an organometallic compound. In this case, however, a coarse carrier could have often caused a problem of impairing the appearance of film products.

The conventional techniques had problems to be solved as described above and thus were hardly regarded as being fully satisfactory.

SUMMARY OF THE INVENTION

The present invention has been accomplished in consideration of the aforedescribed circumstances. An object of this invention is to provide a novel process for preparing very easily and effectively a highly active catalyst composition for polymerizing an olefin having a good particle property in which an olefin polymer having excellent polymer qualities such as composition distribution and appearance of the film products can be prepared, and a process for preparing an olefin with the use of the catalyst.

Hence, the present invention in one aspect thereof provides a powder catalyst composition which comprises a powder comprising fine particles of Component (B), a solution or dispersion in a hydrocarbon of a Sub-component (i) which is a compound of a transition metal belonging to the IVB group of the Periodic Table and a Sub-component (ii) which is (a) an alumoxane, (b) a Lewis acid, or (c) an ionic compound which can convert the Sub-component (i) upon reaction therewith into a cation, coated with Component (A), which is an inorganic compound in the form of fine particles comprising mainly an inorganic oxide and having an average particle diameter of from 0.003 to 1 μm, in a weight ratio of the Component (A) to the Component (B) of from 5:95 to 50:50.

The present invention in another aspect thereof provides a process for polymerizing olefins which comprises contacting an olefin with the aforementioned powder catalyst composition in the presence of an organoaluminium compound thereby to polymerize the olefin.

According to the present invention, olefin polymers having excellent polymer qualities in that they have a homogeneous composition distribution and will produce endowed film product with improved appearance can be prepared easily and effectively with a high catalyst activity and with good particle properties.

DETAILED DESCRIPTION OF THE INVENTION

Powder Catalyst Component

[1] Component (A)

The component (A) for use in the present invention is an inorganic compound in the form of fine particles which comprises mainly, or preferably consists essentially of, an inorganic oxide and has an average particle diameter of primary particles in the range of from 0.003 to 1 μm, preferably from 0.005 to 0.4 μm. The term "average particle diameter" herein means the particle diameter directly measured with an electron microscope. When the particle diameter exceeds the upper limit, the Component (B) will be coated with or occluded in the Component (A) unsatisfactorily and thus transformation of the Component (B), which is usually in the form of liquid, into a powder form, which transformation is a characterizing feature of the present invention, will proceed only unsatisfactorily. From another viewpoint, the inorganic compound in the form of fine particles has preferably a specific surface area in the range of from 10 to 500 m²/g and forms 0.1 to 20 hydroxy groups per 100 square angstrom of the surface area.

The component (A) can alternatively be defined as a particulate inorganic compound comprising mainly, or preferably consisting essentially of, an inorganic oxide having "a Surface Smoothness" smaller than 10. The Surface Smoothness used herein is defined by an equation:

$$\text{Surface Smoothness} = Sa / Sc,$$

wherein Sa means a surface area per 1 gram of the particulate inorganic compound determined by the B.E.T. method where nitrogen gas is used and Sc means a surface area per 1 gram of spherical particles hypothetically thought of having the average particle diameter of the given particulate inorganic compound, which, the Sc, is in turn defined by an equation: $SC = 3/\rho x r$ where $\rho$ means a density of the given particulate inorganic compound and r means a half of the average diameter.

In the invention, the Surface Smoothness is smaller than 10, which is equivalent to Sa / Sc<10. The smaller the ratio Sa / Sc is, the less the particles of the particulate inorganic compound have pores.

As these inorganic compounds, specifically one of inorganic oxides such as $SiO_2$, $Al_2O_3$, MgO, $ZrO_2$, $TiO_2$, $B_2O_3$, CaO, ZnO, BaO or $ThO_2$ or a mixture comprising two or more thereof such as $SiO_2$—MgO, $SiO_2$—$Al_2O_3$, $SiO_2$—$TiO_2$, $SiO_2$—$V_2O_5$, $SiO_2$—$Cr_2O_3$ or $SiO_2$—$TiO_2$—MgO can be used. Among these inorganic compounds, those comprising, as a main or dominant component, at least one component selected from the group consisting of $SiO_2$, $Al_2O_3$ and $ZrO_2$, are preferable and those comprising, as a main component, $SiO_2$ are more preferable. Most preferable inorganic oxide for the Component (A) is one consisting essentially of $SiO_2$.

In this connection, the above-described inorganic oxides can contain a small amount, for example, up to about 30% by weight over the total amount of the Component (A), of additional components such as a carbonate, a sulfate, a nitrate or an oxide other than those enlisted above, for example, $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(N_3)_3$, $Na_2O$, $K_2O$ and $Li_2O$.

[2] Component (B)

The Component (B) is a solution which may be homogeneous or dispersion which may be inhomogeneous in a hydrocarbon containing a transition metal compound of the IVB group in the Periodic Table, viz. Sub-component (i), and (a) an alumoxane, (b) a Lewis acid, or (c) an ionic compound which can convert the Sub-component (i) upon reaction therewith into a cation, viz. Sub-component (ii).

(1) Transition Metal Compounds of the IVB Group in the Periodic Table/Sub-component (i)

As typical compounds of a transition metal of the IVB group in the Periodic Table, transition metal compounds containing a ligand having a cycloalkadienyl structure and transition metal compounds soluble in a hydrocarbon solvent, e.g., $TiCl_4$, $TiCl_2(OR)_2$, wherein R represents a hydrocarbyl group having 1–20 carbon atoms, $VOCl_3$ and the like, can be mentioned with the former compounds preferably used in the present invention.

Typical examples of the transition metal compounds of the IVB group in the Periodic Table can be represented by the formula:

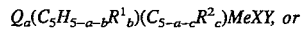

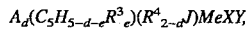

wherein $(C_5H_{5-a-b}R^1{}_b)$, $(C_5H_{5-a-c}R^2{}_c)$ and $(C_5H_{5-d-e}R^3{}_e)$, respectively, represent a conjugated five-membered ring ligand which coordinates with a metal Me, in which $R^1$, $R^2$ and $R^3$ represent, respectively, a monovalent group selected from the group consisting of a hydrocarbyl group having 1–20 carbon atoms, a halogen atom, an alkoxy group having 1–12 carbon atoms, a silicon-containing hydrocarbyl group having 1–24 carbon atoms, a phosphorus-containing hydrocarbyl group having 1–18 carbon atoms, a nitrogen-containing hydrocarbyl group having 1–18 carbon atoms and a boron-containing hydrocarbyl group having 1–18 carbon atoms, $R^4$ represents a monovalent group selected from the group consisting of a hydrocarbyl group having 1–20 carbon atoms, a silicon-containing hydrocarbyl group having 1–24 carbon atoms and an oxygen-containing hydrocarbyl group having 1–20 carbon atoms, wherein $R^1$ and $R^2$ may be the same or different, or $R^1$s, if present in plurality, may be the same or different or may or may not be bonded at their free terminus, and $R^2$ (or $R^3$), if present in plurality, may be the same or different or may or may not be bonded together at their free terminus;

Q represents a divalent bridge group which crosslinks the two conjugated five-membered ring ligands indicated;

A represents a divalent bridge group which crosslinks the groups indicated, viz. $(C_5H_{5-d-e}R^3{}_e)$ and $(R^4{}_{2-d}J)$, in which J represents a nitrogen or phosphorus atom which bonds to Me;

Me represents a transition metal of the IVB group in the Periodic Table;

X and Y, which may be the same or different, each represents a monovalent group consisting of a hydrogen atom, a halogen atom, a hydrocarbyl group having 1–20 atoms, an alkoxy group having 1–20 carbon atoms, an amino group which may or may not be substituted with up to two hydrocarbyl group having 1–20 carbon atoms, a phosphorus-containing hydrocarbyl group having 1–20 carbon atoms and a silicon-containing hydrocarbyl group having 1–20 carbon atoms, respectively;

a and d denote 0 or 1;

b and c denote integers defined as $0 \leq b \leq 5$ and $0 \leq c \leq 5$, respectively, when a denotes 0, and b and c denote integers defined as $0 \leq b \leq 4$ and $0 \leq c \leq 4$, respectively, when a denotes 1;

e denotes an integer defined as $0 \leq e \leq 5$ when d denotes 0 and an integer defined as $0 \leq e \leq 4$ when d denotes 1.

Here, Q represents a divalent bridge or bonding group which crosslinks the two conjugated five-membered ring ligands indicated, and A represents a bonding group which crosslinks the two groups indicated, viz. one which is a conjugated five-membered ring ligand indicated and the group $(R^4_{2-d}J)$ More particularly the bridge groups include (a) an alkylene group such as a methylene group, an ethylene group, an isopropylidene group, a phenylmethylmethylene group, diphenylmethylene group, and a cyclohexylene group; (b) a silylene group such as a silylene group, a dimethylsilylene group, a phenylmethylsilylene group, a diphenylsilylene group, a disilylene group, tetramethyldisilylene group; (c) a hydrocarbyl group containing germanium, phosphorus, nitrogen, boron or aluminum, such as those groups e.g. $(CH_3)_2Ge$, $(C_6H_5)_2Ge$, $(CH_3)P$, $(C_6H_5)P$, $(C_4H_9)N$, $(C_6H_5)N$, $(CH_3)B$, $(C_4H_9)B$, $(C_6H_5)B$, $(C_6H_5)Al$, $(CH_3O)Al$; and the like.

Preferably the bridge group is an alkylene group and a silylene group where the number of atoms, C or Si, in the shortest chain of the bridge may be up to 3, preferably 1 to 2; a and d denotes 0 or 1. In stereoregular polymerization such as polymerization of propylene, it is preferable that a is 1 or d is 1, or more preferably a is 1.

While in the aforementioned formulae the conjugated five-membered ring ligands represented by $(C_5H_{5-a-b}R^1_b)$, $(C_5H_{5-a-c}R^2_c)$ and $(C_5H_{5-d-e}R^3_e)$ are separately defined, a and d, b, c and e, and $R^1$ $R^2$ and $R^3$ have the same meaning among those five-membered groups, respectively (as will be described later in detail), so that it is needless to say that these three conjugated five-membered ring groups may be the same or different.

A specific example of the conjugated five-membered ring groups is the one wherein b=0 (or c=0 and e=0), i.e., a cyclopentadienyl group (having no substituent other than the crosslinking groups Q or A). In the case of the conjugated five-membered ring groups having a substituent, i.e. b≠0 (or c≠0 or e≠0); a specific example of $R^1$ (or $R^2$ or $R^3$) is a hydrocarbyl group having 1 to 20 carbon atoms, preferably 1 to 12 carbon atoms, more preferably 1 to 6 carbon atoms. The hydrocarbyl group may be bonded as a monovalent group to the cyclopentadienyl group, or when $R^1$ (or $R^2$ or $R^3$) is present in plurality among the hydrocarbyl groups may or may not be bonded at their free terminus, namely the opposite end to the end at which it bonds to the cyclopentadienyl group, to form a ring sharing some of the carbon atoms of the cyclopentadienyl group. A typical example of the latter is one in which two of $R^1$ (or $R^2$ or $R^3$) share a double bond in the cyclopentadienyl group and form a fused six-membered ring, i.e., one in which the conjugated five-membered ring groups is an indenyl group, a tetrahydroindenyl group or a fluorenyl group. In other words, typical examples of the conjugated five-membered ring groups are, substituted or non-substituted, cyclopentadienyl, indenyl, tetrahydroindenyl and fluorenyl groups.

$R^1$, $R^2$ and $R^3$ respectively, include, in addition to the above-described hydrocarbyl group having 1 to 20 carbon atoms, preferably 1 to 12 carbon atoms, more preferably 1 to 6 carbon atoms, a halogen atom such as fluorine, chlorine or bromine atom, an alkoxy group such as one having 1 to 12 carbon atoms, a silicon-containing hydrocarbyl group such as one which contains a silicon atom in the form of —Si(R)(R)(R) and has 1 to 24 carbon atoms, a phosphorus-containing hydrocarbyl group such as one which contains phosphorus atom in the form of —P(R)(R) and has 1 to about 18 carbon atoms, a nitrogen-containing hydrocarbyl group such as one which contains nitrogen atom in the form of —N(R)(R) and has 1 to about 18 carbon atoms, and a boron-containing hydrocarbyl group such as one which contains boron atom in the form of —B(R)(R) and has 1 to about 18 carbon atoms. When b (or c) is at least 2 and $R^1$ (or $R^2$ or $R^3$) is present in plurality, these groups may be the same or different. $R^4$ is preferably a monovalent hydrocarbyl group such as an alkyl, a cycloalkyl or an aryl group of 1 to 20, preferably 1 to 12, carbon atoms.

b and c denote an integer defined as $0 \leq b \leq 5$ and $0 \leq c \leq 5$, respectively, when a denotes 0, and b and c denote integers defined as $0 \leq b \leq 4$ and $0 \leq c \leq 4$, respectively, when a denotes 1; e denotes an integer defined as $0 \leq e \leq 5$ when d denotes 0 and an integer defined as $0 \leq e \leq 4$ when d denotes 1.

J is a nitrogen atom or a phosphorus atom which bonds to Me, a nitrogen atom being preferable.

In view of the above, preferable examples of the conjugated five-membered ring ligand of the formulae: $(C_5H_{5-a-b}R^1_b)$, $(C_5H_{5-a-c}R^2_c)$ and $(C_5H_{5-d-e}R^3_e)$ include cyclopentadienyl group, indenyl group, tetrahydroindenyl group, fluorenyl group, and these groups substituted with a lower, such as, e.g. $C_1$ to $C_4$, alkyl group, and preferably examples of the group of the formula: $(R^4_{2-d}J)$ include an alkylamido group having 1 to 20, preferably 1 to 12, carbon atoms.

Me is a transition metal of the IVB group in the Periodic Table, preferably titanium, zirconium or hafnium. When a is 0 or 1, zirconium and hafnium are more preferable, zirconium being still more preferable. When d is 1, titanium is more preferable.

X and Y, respectively, include a hydrogen atom; a halogen atom; a hydrocarbyl group having 1 to 20, preferably 1 to 10 carbon atoms, more preferably 1 to 4 carbon atoms; an alkoxy group having 1 to 20, preferably 1 to 10 carbon atoms, more preferably 1 to 4 carbon atoms; an amino group; an alkylamino group having 1 to 20, preferably 1 to 12 carbon atoms, more preferably 1 to 4 carbon atoms; a phosphorus-containing hydrocarbyl group having 1 to 20, preferably 1 to 12 carbon atoms such as specifically a diphenylphosphine group; and a silicon-containing hydrocarbyl group having 1 to 20, preferably 1 to 12 carbon atoms such as specifically a trimethylsilyl group. X and Y may be the same or different. Among these groups, the halogen groups, especially a chlorine group, and the hydrocarbyl groups, especially an alkyl group having 1 to 4 carbon atoms, are preferred.

Specific examples of the transition metal compound in which Me is zirconium are specified as follows.

(a) Transition metal compounds containing two five-membered ring ligands having no bridge group such as:

(1) bis(cyclopentadienyl)zirconium dichloride, (2) bis(methylcyclopentadienyl)zirconium dichloride, (3) bis(n-butylcyclopentadienyl)zirconium dichloride, (4) bis(dimethylcyclopentadienyl)zirconium dichloride, (5) bis(methyl-n-butylcyclopentadienyl)zirconium dichloride,
(6) bis(trimethylcyclopentadienyl)zirconium dichloride,
(7) bis(tetramethylcyclopentadienyl)zirconium dichloride,
(8) bis(pentamethylcyclopentadienyl)zirconium dichloride,
(9) bis(indenyl)zirconium dimethyl,
(10) bis(indenyl)zirconium dichloride,
(11) bis(indenyl)zirconium monochloride, monohydride,
(12) bis(fluorenyl)zirconium dichloride,
(13) bis(cyclopentadienyl)zirconium monochloride monohydride,
(14) bis(cyclopentadienyl)methylzirconium monochloride,
(15) bis(cyclopentadienyl)ethylzirconium monochloride,
(16) bis(cyclopentadienyl)phenylzirconium monochloride,
(17) bis(cyclopentadienyl)benzylzirconium monochloride,
(18) bis(cyclopentadienyl)neopentylzirconium monochloride,
(19) bis(cyclopentadienyl)cyclohexylzirconium monochloride,
(20) bis(cyclopentadienyl)zirconium dimethyl,
(21) bis(cyclopentadienyl)zirconium diphenyl,
(22) bis(cyclopentadienyl)zirconium dineopentyl,
(23) bis(cyclopentadienyl)methoxyzirconium monochloride,
(24) bis(methylcyclopentadienyl)ethoxyzirconium monochloride,
(25) bis(cyclopentadienyl)zirconium dihydride,
(26) (cyclopentadienyl)(indenyl)zirconium dichloride, and
(27) (cyclopentadienyl)(fluorenyl)zirconium dichloride.

(b) Transition metal compounds containing two five-membered ring ligands crosslinked with an alkylene group such as:

(1) methylenebis(indenyl)zirconium dichloride,
(2) ethylenebis(indenyl)zirconium dichloride,
(3) ethylenebis(indenyl)zirconium monohydride monochloride
(4) ethylenebis(indenyl)methylzirconium monochloride,
(5) ethylenebis(indenyl)phenylzirconium monochloride,
(6) ethylenebis(indenyl)methoxyzirconium monochloride
(7) ethylenebis(indenyl)zirconium diethoxide,
(8) ethylenebis(indenyl)zirconium dimethyl,
(9) ethylenebis(4,5,6,7-tetrahydroindenyl)zirconium dichloride,
(10) ethylenebis(4,5,6,7-tetrahydroindenyl)-methylzirconium monochloride,
(11) ethylenebis(2-methylindenyl)zirconium dichloride,
(12) ethylenebis(4-methylindenyl)zirconium dichloride,
(13) ethylenebis(5-methylindenyl)zirconium dichloride,
(14) ethylenebis(6-methylindenyl)zirconium dichloride,
(15) ethylenebis(7-methylindenyl)zirconium dichloride,
(16) ethylenebis(2,3-dimethylindenyl)zirconium dichloride
(17) ethylenebis(2,4-dimethylindenyl )zirconium dichloride
(18) ethylenebis(4,7-dimethylindenyl )zirconium dichloride
(19) ethylenebis(5-methoxyindenyl)zirconium dichloride,
(20) ethylene(2,4-dimethylcyclopentadienyl)(3',5'-dimethylcyclopentadienyl)zirconium dichloride,
(21) ethylene(2-methyl-4-tert-butylcyclopentadienyl)(3'-tert-butyl-5'-methylcyclopentadienyl)zirconium dichloride,
(22) ethylene(2,3,5-trimethylcyclopentadienyl)(2',4',5'-trimethylcyclopentadienyl)zirconium dichloride,
(23) isopropylidenebis(indenyl)zirconium dichloride,
(24) isopropylidene(2,4-dimethylcyclopentadienyl)-(3',5'-dimethylcyclopentadienyl)zirconium dichloride,
(25) isopropylidene(2-methyl -4-tert-butylcyclopentadienyl) (3'-tert-butyl-5'-methylcyclopentadienyl)zirconium dichloride,
(26) methylene(cyclopentadienyl)(3,4-dimethylcyclopentadienyl)zirconium dichloride,
(27) methylene(cyclopentadienyl)(3,4dimethylcyclopentadienyl)zirconium chloride hydride,
(28) methylene(cyclopentadienyl) (3,4-dimethylcyclopentadienyl)zirconium dimethyl,
(29) methylene(cyclopentadienyl) (3,4-dimethylcyclopentadienyl)zirconium diphenyl,
(30) methylene(cyclopentadienyl)-(trimethylcyclopentadienyl)zirconium dichloride,
(31) methylene(cyclopentadienyl)-(tetramethylcyclopentadienyl)zirconium dichloride,
(32) isopropylidene(cyclopentadienyl)(3,4dimethylcyclopentadienyl)zirconium dichloride,
(33) isopropylidene(cyclopentadienyl)(2,3,4,5-tetramethylcyclopentadienyl)zirconium dichloride,
(34) isopropylidene(cyclopentadienyl)(3-methylindenyl)zirconium dichloride,
(35) isopropylidene(cyclopentadienyl)-(fluorenyl)zirconium dichloride,
(36) isopropylidene(2-methylcyclopentadienyl)-(fluorenyl)zirconium dichloride,
(37) isopropylidene(2,5-dimethylcyclopentadienyl)(3',4'-dimethylcyclopentadienyl)zirconium dichloride,
(38) isopropylidene(2,5-dimethylcyclopentadienyl)-(fluorenyl)zirconium dichloride,
(39) ethylene(cyclopentadienyl )(3,5-dimethylcyclopentadienyl)zirconium dichloride,
(40) ethylene(cyclopentadienyl)(fluorenyl)zirconium dichloride,
(41) ethylene(2,5-dimethylcyclopentadienyl)-(fluorenyl)zirconium dichloride,
(42) ethylene(2,5-diethylcyclopentadienyl)-(fluorenyl)zirconium dichloride,
(43) diphenylmethylene(cyclopentadienyl)(3,4-diethylcyclopentadienyl)zirconium dichloride,
(44) diphenylmethylene(cyclopentadienyl)(3,4-diethylcyclopentadienyl)zirconium dichloride,
(45) cyclohexylidene(cyclopentadienyl)-(fluorenyl)zirconium dichloride, and
(46) cyclohexylidene(2,5-dimethylcyclopentadienyl)-(3',4'-dimethylcyclopentadienyl)zirconium dichloride.

(c) Transition metal compounds containing two five-membered ring ligands crosslinked with a silylene group:

(1) dimethylsilylenebis(indenyl)zirconium dichloride, (2) dimethylsilylenebis(4,5,6,7-tetrahydroindenyl)-zirconium dichloride,
(3) dimethylsilylenebis(2-methylindenyl)zirconium dichloride,
(4) dimethylsilylenebis(2,4-dimethylindenyl)zirconium dichloride,
(5) dimethylsilylene(2,4-dimethylcyclopentadienyl-)(3',5'-dimethylcyclopentadienyl)zirconium dichloride,
(6) phenylmethylsilylenebis(indenyl)zirconium dichloride,
(7) phenylmethylsilylenebis(4,5,6,7-tetrahydroindenyl)zirconium dichloride,
(8) phenylmethylsilylene(2,4-dimethylcyclopentadienyl)(3',5'-dimethylcyclopentadienyl)zirconium dichloride,
(9) phenylmethylsilylene(2,3,5-trimethylcyclopentadienyl)(2',4',5'-trimethylcyclopentadienyl)zirconium dichloride,
(10) phenylmethylsilylenebis(tetramethylcyclopentadienyl)zirconium dichloride,
(11) diphenylsilylenebis(indenyl)zirconium dichloride,
(12) tetramethyldisilylenebis(indenyl)zirconium dichloride,
(13) tetramethyldisilylenebis(cyclopentadienyl)zirconium dichloride,
(14) tetramethyldisilylene(3-methylcyclopentadienyl)-(indenyl)zirconium dichloride,
(15) dimethylsilylene(cyclopentadienyl)(3,4-dimethylcyclopentadienyl)zirconium dichloride,
(16) dimethylsilylene(cyclopentadienyl)-(trimethylcyclopentadienyl)zirconium dichloride,
(17) dimethylsilylene(cyclopentadienyl)-(tetramethylcyclopentadienyl)zirconium dichloride,
(18) dimethylsilylene(cyclopentadienyl)(3,4-diethylcyclopentadienyl)zirconium dichloride,
(19) dimethylsilylene(cyclopentadienyl)-(triethylcyclopentadienyl)zirconium dichloride,
(20) dimethylsilylene(cyclopentadienyl)-(tetraethylcyclopentadienyl)zirconium dichloride,
(21) dimethylsilylene(cyclopentadienyl)-(fluorenyl)zirconium dichloride,
(22) dimethylsilylene(cyclopentadienyl)(2,7-di-tert-butylfluorenyl)zirconium dichloride,
(23) dimethylsilylene(cyclopentadienyl)-(octahydrofluorenyl)zirconium dichloride,
(24) dimethylsilylene(2-methylcyclopentadienyl)-(fluorenyl)zirconium dichloride,
(25) dimethylsilylene(2,5-dimethylcyclopentadienyl)-(fluorenyl)zirconium dichloride,
(26) dimethylsilylene(2-ethylcyclopentadienyl)-(fluorenyl)zirconium dichloride,
(27) dimethylsilylene(2,5-diethylcyclopentadienyl)-(fluorenyl)zirconium dichloride,
(28) dimethylsilylene(2-methylcyclopentadienyl)(2,7-di-tert-butylfluorenyl)zirconium dichloride,
(29) dimethylsilylene(2,5-dimethylcyclopentadienyl)-(2',7'-di- tert-butylfluorenyl)zirconium dichloride,
(30) dimethylsilylene(2-ethylcyclopentadienyl)(2',7'-di-tert-butylfluorenyl)zirconium dichloride,
(31) dimethylsilylene(diethylcyclopentadienyl)(2,7-di-tert-butylfluorenyl)zirconium dichloride,
(32) dimethylsilylene(methylcyclopentadienyl)-(octahydrofluorenyl)zirconium dichloride,
(33) dimethylsilylene(dimethylcyclopentadienyl)-(octahydrofluorenyl)zirconium dichloride,
(34) dimethylsilylene(ethylcyclopentadienyl)-(octahydrofluorenyl)zirconium dichloride, and
(35) dimethylsilylene(diethylcyclopentadienyl)-(octahydrofluorenyl)zirconium dichloride.

(d) Transition metal compounds containing a five-membered ring ligand crosslinked with a hydrocarbyl group containing germanium, aluminum, boron, phosphorus or nitrogen:

(1) dimethylgermaniumbis(indenyl)zirconium dichloride,
(2) dimethylgermanium(cyclopentadienyl)-(fluorenyl)zirconium dichloride,
(3) methylaluminumbis(indenyl)zirconium dichloride,
(4) phenylaluminumbis(indenyl)zirconium dichloride,
(5) phenylphosphynobis(indenyl)zirconium dichloride,
(6) ethylphoranobis(indenyl)zirconium dichloride,
(7) phenylaminobis(indenyl)zirconium dichloride,
(8) phenylamino(cyclopentadienyl)(fluorenyl)zirconium dichloride, and the like.

(e) Transition metal compounds containing a one five-membered ring ligand:

(1) cyclopentadienylzirconium trichloride,
(2) pentamethylcyclopentadienylzirconium trichloride,
(3) cyclopentadienylzirconium trimethyl,
(4) cyclopentadienylzirconium tribenzyl,
(5) cyclopentadienylzirconium triethoxide,
(6) cyclopentadienylzirconium triphenoxide,
(7) (cyclopentadienyl)methylzirconium dichloride,
(8) cyclopentadienylzirconium tris(trimethylsilylmethyl),
(9) cyclopentadienylzirconium tris(dimethylamido),
(10) indenylzirconium trichloride,
(11) methylene(tetramethylcyclopentadienyl)(t-butylamido)zirconium dichloride,
(12) ethylene(tetramethylcyclopentadienyl)(t-butylamido)zirconium dichloride,
(13) ethylene(tetramethylcyclopentadienyl)-(methylamido)zirconium dichloride,
(14) dimethylsilylene(tetramethylcyclopentadienyl)(t-butylamido)zirconium dichloride,
(15) tetramethyldisilylene(tetramethylcyclopentadienyl)-(t-butylamido)zirconium dichloride,
(16) dimethylsilylene(indenyl)(t-butylamido)zirconium dichloride,
(17) dimethylsilylene(9-fluorenyl)(t-butylamido)zirconium dichloride,
(18) pentamethylcyclopentadienylbis(phenyl)amidozirconium dichloride,
(19) indenylbis(phenyl)amidozirconium dichloride,
(20) 4,5,6,7-tetrahydroindenyl-bis(trimethylsilyl)amidozirconium dichloride,
(21) pentamethylcyclopentadienylbisphenyl-phosphinozirconium dichloride,
(22) dimethylsilylene(tetramethylcyclopentadienyl)-phenylamidozirconium dichloride,
(23) dimethylsilylene(tetrahydroindenyl)-decylamidozirconium dichloride,
(24) dimethylsilylene(tetrahydroindenyl)-((trimethylsilyl)amido)zirconium dichloride,

(25) dimethylgerman(tetramethylcyclopentadienyl)-(phenyl)amidozirconium dichloride, and

(26) phenylmethylsilylene(fluorenyl)(2,6-diisopropylphenyl)amidozirconium dichloride.

(f) The aforementioned compounds (a)–(e) of which chlorine has been replaced with the other substituents such as bromine, iodine, hydride, methyl or phenyl can also be used and are other examples of Sub-component (i) in the present invention.

In the present invention, the aforementioned compounds (a)–(e) of which the central metal, zirconium, has been replaced with the other metal such as titanium or hafnium can also be used and are still other examples of Sub-component (i) in the present invention.

Among these compounds, the zirconium compounds, the hafnium compounds and the titanium compounds are preferred. The more preferred ones are the titanium compound, the zirconium compound and the hafnium compound crosslinked with a short chain alkylene group or a short chain silylene group.

More particularly, preferred examples of the transition metal compounds of the IVB group in the Periodic Table can be represented by the formula given hereinbefore:

$$Q_a(C_5H_{5-a-b}R^1{}_b)(C_5H_{5-a-c}R^2{}_c)MeXY, \text{ or}$$

$$A_d(C_5H_{5-d-e}R^3{}_e)(i\ R^4{}_{2-d}J)MeXY,$$

where a=0, $R^1$ and $R^2$ are each an alkyl group of 1–6 carbon atoms, b and c are each 1 or 2, X and Y are each a halogen atom, preferably a chlorine atom, or an alkyl group of 1–4 carbon atoms, and Me is Ti, Zr or Hf;

where a=1, Q is an alkylene group of 1–3 carbon atoms or a silylene group having two hydrocarbyl substituents thereon each of 1–8 carbon atoms, $(C_5H_{5-a-b}R^1{}_b)$ and $(C_5H_{5-a-c}R^2{}_c)$ are each an indene group which may or may not be substituted by up to 3 alkyl groups of 1–6 carbon atoms, or a cyclopentadienyl group where b=c=2, and $R^1$ and $R^2$ are each an alkyl group of 1–6 carbon atoms, and Me is Ti, Zr or Hf; or where d=1, A is an alkylene group of 1–3 carbon atoms or a silylene group having two hydrocarbyl substituents thereon each of 1–8 carbon atoms, X and Y are each a halogen atom, preferably a chlorine atom or an alkyl group of 1–carbon atoms, and J is a nitrogen atom.

More preferable compounds are:

those where a=0, $R^1$ and $R^2$ are each an alkyl group of 1–6 carbon atoms, b=c=1, X=Y=Cl and Me is Zr or Hf;

those where a=1, Q is a group selected from the group consisting of methylene, ethylene, isopropylidene and dimethylsilylene groups $(C_5H_{5-a-b}R^1{}_b)$ and $(C_5H_{5-a-c}R^2{}_c)$ are each an indene group which may or may not be substituted by up to 3 alkyl groups each of 1–8 carbon atoms, X=Y=Cl, and Me is Zr or Hf; or those where d=1, A is a dimethylsilyl group, $R^3$ is a methyl group, $R^4$ is selected from the group consisting of an alkyl group of 4–12 carbon atoms, a cycloalkyl of 4–12 carbon atoms and an aryl group, X=Y=Cl, J is a nitrogen atom, and Me is Ti.

(2) Alumoxanes, Lewis acids, and ionic compounds which can convert the Sub-component (i) upon reaction therewith into a cation/Sub-component (ii)

(a) Alumoxanes Any known alumoxanes can be used in the present invention.

Alumoxanes are prepared by any suitable method such as:

(1) a method by which an organoaluminum compound is added to a dispersion in a hydrocarbon of a salt having water adsorbed thereto or water of crystallization such as magnesium hydrate, copper sulfate hydrate, aluminum sulfate hydrate, nickel sulfate hydrate or cerous chloride hydrate and the alumoxane formed is recovered as a solution in the hydrocarbon used; and (2) a method by which an organoaluminum compound is reacted in a solvent such as a hydrocarbon e.g. benzene or toluene or an ether such as diethylether or tetrahydrofuran directly with water which is in the form of free water, ice or steam and the alumoxane formed is recovered as a solution in the hydrocarbon.

Examples of organoaluminum compounds used in the methods given above include (a) trialkylaluminums such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum, tridecylaluminum, tricyclohexylaluminum and tricyclooctylaluminum; (b) dialkylaluminum hydrides such as dimethylaluminum chloride, diethylaluminum chloride, diethylaluminum bromide, and diisobutylaluminum chloride; (c) dialkylaluminum hydrides such as diethylaluminum hydride, and diisobutylaluminum hydride; (d) dialkylaluminum alkoxide such as diethylaluminum methoxide, and diethylaluminum ethoxide; and (e) dialkylaluminum aryloxides such as diethylaluminum phenoxide. These can be used alone or in combination.

Trialkylaluminums are preferable and tri lower alkylaluminums of 1 to 4 carbon atoms in each of the alkyl groups are more preferable among these. Isoprenylaluminum is another example of the organoaluminum compounds.

Preferable alumoxanes are thus alkylalumoxanes and more preferable alumoxanes are thus lower alkylalumoxanes of 1 to 4 carbon atoms in each of the alkyl groups. The alkyl alumoxanes can be such that, in addition to those where the alkyl comprises a single species such as methyl, the alkyl comprises different species, and methyl isobutyl alumoxanes are thus examples of the lower alkylalumoxanes.

Alumoxanes as prepared typically in a solution, can be used for making the Sub-component (ii) in the present invention, and alumoxanes separated from the solvent used and/or the unreacted organoaluminum used can, also be re-dissolved in a hydrocarbon can also be used as such or as being re-dissolved in a hydrocarbon solution for making the Sub-component (ii).

Alumoxanes can still further be used in combination with an organoaluminum compound such as those used as a co-catalyst in the olefin polymerization which will hereinbelow be described in more detail.

(b) Lewis acids

Some of Lewis acids can be regarded as "compounds which can convert the Sub-component (i) upon reaction therewith into a cation". Compounds which belong to a group of "Lewis acids" as well as to a group of "compounds which can convert the Sub-component (i) upon reaction therewith into a cation" are to be taken as belonging to either one of the groups.

Examples of Lewis acids, particularly those which can convert the Sub-component (i) into a cation, are various organoboron compounds, metal halide compounds and solid acids, and preferable examples include organoboron compounds wherein all the substituents are organic such as triphenylboron, tris(3,5-difluorophenyl)boron, and tris(pentafluorophenyl)boron; and metal halide compounds wherein the metal may preferably be magnesium or aluminum such as aluminum chloride, aluminum bromide, aluminum iodide, magnesium chloride, magnesium bromide, magnesium iodide, magnesium bromochloride, magnesium iodochloride, magnesium iodobromide, magnesium chloride hydride, magnesium chloride hydride, magnesium bromide hydroxide, magnesium chloride alkoxide, magnesium bromide alkoxide. More preferable examples are organoboron compounds wherein all the substituents are organic, especially tris(pentafluorophenyl)boron.

(c) Compounds which can convert the Sub-component (i) upon reaction therewith into a cation Typical examples of such compounds include those represented by a formula:

$$[K]^{e+}[Z]^{e-} \qquad [I]$$

wherein K indicates an ionic cation component such as a carbonium cation, a tropylium cation, an ammonium cation, an oxonium cation, a sulfonium cation and a phosphonium cation. Other examples are cations of easily reducible metals or of organometal compounds.

Examples of these cations include triphenylcarbonium, diphenylcarbonium, cycloheptatrienium, indenium, triethylammonium, tripropylammonium, tributylammonium, N,N-dimethylanilinium, dipropylammonium, dicyclohexylammonium, triphenylphosphonium, trimethylphosphonium, tri(dimethylphenyl)phosphonium, tri(methylphenyl)phosphonium, triphenylphosphonium, triphenyloxonium, triethyloxonium, pyrilium, and silver ions, gold ions, platinum ions, copper ions, paradium ions, mercury ions, and ferrocenium ion. Preferable examples of the cations are triphenylcarbonium and N,N-dimethylanilinium.

Z in the formula [I] is an ionic anion component of an ionic valence of e, which will form a counter anion to a cation derived from the Sub-component (i), the counter anion being, in general, not coordinated with the cation.

Examples of the anions include anionic organoboron compounds, anionic organoaluminum compounds, anionic organogallium compounds, anionic organophosphorus compounds, anionic organoarsenic compounds, and anionic organoantimony compounds.

Specific examples include tetraphenylborate, tetrakis(3,4,5-trifluorophenyl)borate, tetrakis(3,5-di(trifluoromethyl)phenyl)borate, tetrakis(3,5-di(t-butyl)phenyl)borate, and tetrakis(pentafluorophenyl)borate; tetraphenylaluminate, tetrakis(3,4,5-trifluorophenyl)aluminate, tetrakis(3,5-di(trifluoromethyl)phenyl)aluminate, tetrakis(3,5-di(t-butyl)phenyl)aluminate, and tetrakis(pentafluorophenyl)aluminate; tetraphenylgallate, tetrakis(3,4,5-trifluorophenyl)gallate, tetrakis(3,5-di(trifluoromethyl)phenyl)gallate, tetrakis (3,5-di(t-butyl)phenyl)gallate, and tetrakis(pentafluorophenyl)gallate; hexafluorophosphate; hexafluoroarsenate; hexafluoroantimonate; decaborate, undecaborate, carbadodecaborate, and decachlorodecaborate. Preferable examples are anionic organoboron compounds, especially tetrakis(pentafluorophenyl)borate.

These ionic compounds and Lewis acids can be used singly as the Sub-component (ii), or they can be used in combination with an alumoxane or in combination with an organoaluminum compound such as a trialkylaluminum, a di lower alkylaluminum monohalide, a mono lower alkylaluminum dihalide, a lower alkylaluminum sesquihalide, and those where some of the lower alkyl group has been replaced by a phenoxy group, such as trimethylaluminum, triethylaluminum, triisobutylaluminum, diethylaluminum phenoxide and dimethylaluminum chloride. When the Sub-component (ii) is a Lewis acid or an ionic compound which can convert the Sub-component (i) upon reaction therewith into a cation, it is preferable to use the Lewis acid or the ionic compound in combination with an alumoxane or a trialkylaluminum.

(3) Preparation of the Component (B)

The Component (B) can be prepared by mixing and contacting the above-described Sub-components (i) and (ii) with each other ordinarily in a hydrocarbon solvent such as hexane, heptane, decane, benzene, toluene, or cyclohexane. Generally, the Component (B) is prepared by mixing a solution, preferably in a hydrocarbon, of the Sub-component (i) and a solution, preferably in a hydrocarbon, of the Sub-component (ii), which solutions have been prepared. The Component (B) can also be prepared by adding, to one of the Sub-components in solution in, e.g. a hydrocarbon, the remaining of the Sub-components which is as such or in a solution in one portion or stepwise.

The contact temperature is in the range from −50° to 100° C. preferably from 0° to 60° C. and the contact time is in the range from 1 minute to 10 hours, preferably from 30 minutes to 3 hours.

The concentration of the hydrocarbon solution as the Component (B) is in the range from 0.005 to 100 g/lit., preferably from 0.01 to 10 g/lit., based on the transition metal, the mole ratio between the Sub-component (i) and the Sub-component (ii), viz. Sub-component (ii)/Sub-component (i), is in the range from 0.1 to 10,000, preferably from 0.2 to 2,000, more preferably from 0.5 to 500. When the Sub-component (ii) is an alumoxane, and the ratio between the Sub-component (i) and the Sub-component (ii), based on the ratio of Al/transition metal, is in the range from 1 to 10,000, preferably from 5 to 2,000, more preferably from 10 to 500. When the Sub-component (ii) is a combination of a Lewis acid or a compound which can convert the Sub-component (i) upon reaction therewith into a cation with an alumoxane or a trialkylaluminum, the amount of an alumoxane or a trialkylaluminum relative to the amount of the Sub-component (i), viz. as the ratio of Al/transition metal, is in the range from 1 to 10,000, preferably 5 to 2,000, more preferably from 10 to 500.

[3] Forming of Powder Catalyst Component

The powder catalyst component of the present invention is a powder comprising fine particles of the Component (B) coated with the Component (A). Any suitable method of forming the powder is used as long as it will produce a good powder product, or typically a powder product comprising particles each of which has a liquid inside which has come from the Component (B) and a solid outside which has come from the Component (A) covering the droplet of the Component (B) inside. The powder is generally formed at a temperature in the range from the melting point of the hydrocarbon solvent used in the preparation of the Component (B) or more to the boiling point of the solvent or less, typically from −20° to 80° C., preferably from 0° to 80° C. Although the order of feeding of the Components (A) and (B) or which Component is added to which Component is not necessarily restricted to a specific one, the Component (B) is preferably added rapidly and contacted with the Component (A) in the form of powder in a fluidized state under stirring in order to efficiently put the Component (B) into a powder form, since a fluid powder catalyst comprising particles each of which has a liquid inside and a solid outside covering the liquid inside can thus be easily synthesized. The time for addition and stirring of the components is in the range from 1 to 60 minutes, preferably from 5 to 30 minutes. If the stirring is conducted at an excessively slow rate or for an unduely long time, the "powdering" will proceed insufficiently due to the unsatisfactory coating or occlusion of the Component (B) with the Component (A).

In order to obtain the contact product which remains powdery, the weight ratio of the Component (A) to the Component (B) is from 5:95 to 50:50, preferably from 15:85 to 40:60. The weight ratio is equivalent to the ratio based on percent by weight of from 5:50 to 95:50. The powder catalyst composition is excellent in fluidity and, in addition, in storage properties due to the fact that the powder form is maintained over a long period.

The powder catalyst component according to the present invention is characterized by, inter alia, its fluid or free-flowing property even though the mass contains a liquid, viz. Component (B), in 50 to 95% by weight (of the total weight of Components (A)+(B)). The fluid or free-flowing property of the powder catalyst composition in accordance with the present invention is assumed to be secured by selection of a particular type of materials and/or a particular numerical conditions, and the degree of the fluid or free-flowing nature may be shown by a rather small angle of repose of the powder catalyst composition. The powder catalyst composition in accordance with the present invention typically has an angle of respose of 35° to 60°.

While the present powder catalyst composition can be directly employed for the polymerization of olefins, it can also be employed after it has undergone preliminary polymerization such that it is contacted with an olefin stream substantially in the absence of a solvent at a temperature which is preferably lower than the level to be used for polymerizing olefins in the main polymerization step and which may be from −20° to 70° C., preferably from 0° to 60° C., thereby to polymerize the olefin in an amount of 0.5 to 100, preferably 0.5 to 50, g polyolefin/g powder catalyst composition from which the amount of the hydrocarbon for the Component (B) is subtracted. The preliminary polymerization should preferably be conducted by a gas-phase polymerization.

Examples of the olefins used for preliminary polymerization are α-olefins having up to 20 carbon atoms such as ethylene, propylene, 1-butene, 4-methyl-1-pentene, 1-hexene, 1-octene, 1-decene, 1-dodecene or 1-tetradecene or a mixture thereof. Among these olefins, ethylene, propylene, butene, hexene and a mixture thereof is preferably used.

Such preliminary polymerization can be conducted batchwise or continuously and can also be conducted under any pressure conditions such as reduced pressure, atmospheric pressure or positive pressure. In addition, a molecular weight modifier such as hydrogen may or may not be used.

[II] Use of the Powder Catalyst Component/Polymerizing Olefins

The aforedescribed powder catalyst composition according to the present invention is effective in polymerizing an olefin, particularly in producing an ethylene homopolymer and copolymers of ethylene with an α-olefin.

(1) Olefin

Examples of olefins which can be used for the olefin polymerization process of the present invention include ethylene and α-olefins having 3 to 20 carbon atoms such as propylene, 1-butene, 1-pentene, 1-hexene, 4-methyl-1-pentene, 1-octene, 1-decene, 1-dodecene, 1-tetradecene, 1-hexadecene, 1-octadecene, 1-eicosene, cyclopentene, cycloheptene, norbornene, 5-methyl-2-norbornene, and tetracyclododecene. These olefins can be used as an admixture thereof.

(2) Organoaluminum Compound

The organoaluminum compounds which can be used as a co-catalyst for the powder catalyst component according to the present invention for the olefin polymerization process of the present invention include those of a formula:

$$R^4{}_p AlX^3{}_{3-p'}$$

where $R^4$ represents a hydrocarbyl group of 1 to 12 carbon atoms, $X^3$ represents a halogen or hydrogen atom and p denotes a numeral from 1 to 3.

In the above-described formula, $R^4$ represents a hydrocarbyl group having 1 to 12 carbon atoms such as an alkyl group, a cycloalkyl group or an aryl group, specifically a methyl group, an ethyl group, an n-propyl group, an isopropyl group, an isobutyl group, a pentyl group, a hexyl group, an octyl group, a cyclopentyl group, a cyclohexyl group, a phenyl group, and a tolyl group.

Examples of these organoaluminum compounds include:
(a) a trialkylaluminum such as trimethylaluminum, triethylaluminum, triisopropylaluminum, triisobutylaluminum, trioctylaluminum, or tri-2-ethylhexylaluminum;
(b) an alkenylaluminum such as isoprenylaluminum;
(c) a dialkylaluminum halide such as dimethylaluminum chloride, diethylaluminum chloride, diisopropylaluminum chloride, diisobutylaluminum chloride, or dimethylaluminum bromide;
(d) an alkylaluminum sesquihalide such as methylaluminum sesquichloride, ethylaluminum sesquichloride, isopropylaluminum sesquichloride, or butylaluminum sesquibromide;
(e) an alkylaluminum dihalide such as methylaluminum dichloride, ethylaluminum dichloride, isopropylaluminum dichloride, or ethylaluminum dibromide;
(f) an alkylaluminum hydride such as diethylaluminum hydride, or diisobutylaluminum hydride.

As organoaluminum compounds other than those described above, the compounds represented by the following formula can also be used:

$$R^5{}_q AlY_{3-q'}$$

wherein $R^5$ has the same meaning as defined above, Y represents an —$OR^6$ group, an —$OSiR^7{}_3$ group, an —$OAlR^8{}_2$ group, an —$NR^9{}_3$ group, an $SiR^{10}{}_3$ group or an —$NR^{11}AlR^{12}{}_2$ group, q denotes a numeral from 1 to 2, , $R^6$, $R^7$, $R^8$ and $R^{12}$ each represent a hydrocarbyl group carbon of up to 8 atoms such as a methyl group, an ethyl group, an isopropyl group, an isobutyl group, a cyclohexyl group, or a phenyl group, $R^9$ represents hydrogen atom, a hydrocarbyl group such as a lower alkyl group, e.g. a methyl group, an ethyl group, or an isopropyl group, or a phenyl group; or a tri lower alkylsilyl group e.g. a trimethylsilyl group, and $R^{10}$ and $R^{11}$ each represent a lower alkyl group e.g. a methyl group, or an ethyl group.

Specific examples of these organoaluminum compounds include:
dimethylaluminum methoxide, diethylaluminum ethoxide, diisobutylaluminum methoxide, $(C_2H_5)_2Al(OSi(CH_3)_3)$, $(iso\text{-}C_4H_9)_2Al(OSi(CH_3)_3)$, $(iso\text{-}C_4H_9)_2Al(OSi(C_2H_5)_3)$, $(CH_3)_2AlOAl(CH_3)_2$, $(iso\text{-}C_4H_9)_2AlOAl(iso\text{-}C_4H_9)_2$, $(CH_3)_2AlN(C_2H_5)_2$, $(C_2H_5)_2AlNHCH_3$, $(CH_3)_2AlNHC_2H_5$, $(C_2H_5)_2AlN((CH_3)_3Si)_2$, $(iso\text{-}C_4H_9)_2AlN((CH_3)_3Si)_2$, $(iso\text{-}C_4H_9)_2AlSi(CH_3)_3$, $(C_2H_5)_2AlN(CH_3)Al(C_2H_5)_2$, and $(iso\text{-}C_4H_9)_2AlN(C_2H_5)Al(iso\text{-}C_4H_9)_2$.

These organoaluminum compounds may or may not be used as an admixture of two or more thereof. Among these compounds, especially the trialkylaluminum is preferably used.

(3) Polymerization of Olefins

While in the process of the present invention an olefin can be polymerized either in the vapor or gas phase or in the liquid phase such as by the slurry method, the present process is applied preferably to the vapor or gas phase process.

When the polymerization of an olefin according to the present invention is conducted by the vapor phase method, the polymerization temperature is in the range from 0° to 120° C. preferably from 20° to 100° C. The temperature for the slurry polymerization may lie between 20° to 100° C.

When the polymerization of olefins according to the present invention is conducted by the vapor phase polymerization method or by the slurry polymerization method, the amount of the transition metal compound used is, when indicated as the concentration of the transition metal in the polymerization reaction system, generally in the range from 0.01 to 500 ppm by weight, preferably 0.1 to 100 ppm by weight per the amount of the polymer retained in the polymerization zone for gas-phase continuous polymerization, and in the range from $10^{-8}$ to $10^{-2}$ gram atom/liter, preferably from $10^{-7}$ to $10^{-3}$ gram atom/liter for slurry polymerization. The polymerization of an olefin is conducted in the presence of the organoaluminum compound described above and the atomic ratio of the organoaluminum as Al to the transition metal as Me, viz. Al/Me, is in the range from 5 to 2,000, preferably from 10 to 300, more preferably from 15 to 200.

The polymerization pressure is in the range from atmospheric pressure to 100 Kg/cm$^2$, preferably at a pressure from 2 to 50 Kg/cm$^2$, and the polymerization can also be conducted by a batch process, a semi-continuous process or a continuous process.

Furthermore, the polymerization can be conducted in two or more steps where reaction conditions are different from step to step.

EXAMPLES

The following examples are provided by way of illustrating of the present invention in more detail, and thus the present invention should not be construed to be limited thereto.

Example 1

Preparation of the Catalyst

Into a 300 ml flask which had been fully purged with nitrogen, 2.08 g of silica ("AEROSIL 200", 0,012 μ, Sa/Sc= 1.0, manufactured by NIPPON AEROSIL) was fed, and then 8 ml of homogeneous solution of a mixture of 8 ml of a solution of methylalumoxane in toluene which had been prepared by removing toluene from a solution of methylalumoxane in toluene manufactured by SCHERING and then dissolving the methylalumoxane again in toluene to have an Al content of 92 g/liter and 19.3 mg of bis(n-butylcyclopentadienyl)zirconium dichloride were added dropwise with stirring over 2 minutes at room temperature. The solution was stirred for further 5 minutes whereby a fluid or free-flowing powder catalyst of an angle of repose of 55° was obtained. By this procedure, 9.0 g of the catalyst was prepared.

Polymerization

Into a 1.5 liter stainless steel autoclave (made of SUS stainless steel) which had been fully purged with nitrogen at 75° C., a mixture of 70 g of polypropylene powder and 1.13 g of the catalyst prepared above was introduced, and then triisobutylaluminum in an amount of 13.6 mg based on Al was introduced. The autoclave was purged with ethylene gas, and 50 ml of hydrogen and ethylene gas were immediately introduced to initiate polymerization at a total pressure of 7 Kg/cm$^2$·G. Only ethylene gas was then supplied to maintain the total pressure at 7 Kg/cm$^2$·G. After 10 minutes the temperature was raised to 85° C., and the polymerization was conducted for 2 hours. As a result, 49.6 g of a polymer (ZrY90000) having a Q value which is a ratio of $M_W/M_N$ where $M_W$ and $M_N$ respectively indicate weight-average and number-average molecular weights determined by a gel permeation chromatography of 2.6 was obtained. The amount of 49.6 g of a polymer corresponds to a yield based on the amount of Zr used, ZrY in g-polymer/Zr atom, of 90,000.

Comparative Example 1

Preparation of the Catalyst

Procedures in Example 1 were repeated except that silica (AEROSIL) was replaced by 2 g of silica manufactured by FUJI DEVISON CO., SILOID 244, of an average particle diameter of 3.5 μm, Sa/Sc=350. The whole mixture was wetted and no free flowing powder catalyst was formed. The catalyst had an angle of repose of larger than 65° which was not measurable.

Comparative Example 2

Preparation of the Catalyst

Procedures in Example 1 were repeated except that silica (AEROSIL) was replaced by 2.0 g of silica manufactured by DEVISON CO., Grade 952, of an average particle diameter of 55 μm, Sa/Sc=5500. The whole mixture was wetted and no free flowing powder catalyst was formed. The catalyst had an angle of repose of larger than 65° which was not measurable.

Example 2

Preparation of the Catalyst

Into a 300 ml flask which had been fully purged with nitrogen, 2.10 g of silica, AEROSIL as used in Example 1, was fed, and then 7.4 ml of a homogeneous solution of a mixture of 4.4 ml of a solution of methylalumoxane in toluene which had been prepared by removing toluene from a solution of methylalumoxane in toluene manufactured by SCHERING and then dissolving the methylalumoxane again in toluene to have an Al content of 46.6 g/liter, 3 ml of a solution of triisobutylaluminum in heptane of an Al content of 19.6 g/liter and 29.6 mg of bis(n-butylcyclopentadienyl)zirconium dichloride was added dropwise with stirring over 2 minutes at room temperature. The solution was stirred for further 5 minutes whereby a fluid or free flowing powder catalyst of an angle of repose of 53° was obtained. By this procedure, 7.7 g of the catalyst was prepared.

Polymerization

The procedure was conducted as in Example 1 except that 1.34 g of the aforementioned catalyst was employed and the polymerization was conducted for 75 minutes to give a polymer in a yield of 67.1 g, ZrY being 57,000.

Example 3

Preparation of Catalyst Which Has Undergone Preliminary Polymerization

A fluid or free flowing powder catalyst was obtained by repeating the procedure in Example 1 except that the solution of methylalumoxane in toluene (Al content: 92 g/liter) was replaced by 8 ml of a solution of methylalumoxane in toluene of an Al content of 46.6 g/liter. The fluid powder catalyst thus prepared was, after being cooled with ice-water, subjected to preliminary polymerization carried out at a temperature of 10° to 20° C. for 1 hour with ethylene gas continuously introduced at atmospheric pressure. A catalyst having undergone preliminary polymerization was obtained in a yield of 15.22 g by this procedure. The catalyst obtained had an angle of repose of 45°.

Polymerization

The procedure in Example 1 was repeated except that the powder catalyst was replaced by 1.80 g of the catalyst having undergone preliminary polymerization described above and the polymerization was conducted for 2 hours to give 12.5 g of a polymer, ZrY being 22,000.

Example 4

Preparation of Catalyst Which Has Undergone Preliminary Polymerization

The procedure in Example 3 was repeated except that the bis(n-butylcyclopentadienyl)zirconium dichloride was replaced by 27.0 mg of ethylenebisindenylzirconium dichloride, and 11.17 g of the catalyst having undergone preliminary polymerization was obtained. The catalyst obtained had an angle of repose of 46°.

Polymerization

The procedure in Example 1 was repeated except that 1.92 g of the preliminary polymerization catalyst described above was used and the polymerization was carried out for 2 hours to give 32.4 g of the polymer, ZrY being 32,000.

Example 5

Preparation of Catalyst Which Has Undergone Preliminary Polymerization

After the catalyst components were mixed together in the same manner as in Example 2, the mixture obtained was cooled with ice-water, which was then subjected to preliminary polymerization for 1 hour at a temperature of 10° to 20° C. with continuous introduction of ethylene gas at atmospheric pressure. By this procedure 10.08 g of the catalyst having undergone preliminary polymerization was obtained. The catalyst obtained had an angle of repose of 48°.

Polymerization

The procedure in Example 1 was repeated except that 1.45 g of the aforementioned catalyst having undergone preliminary polymerization was used and that the polymerization was conducted for 2 hours to give 51.9 g of the polymer, ZrY being 49,000.

Example 6

Polymerization

The procedure in Example 1 was repeated except that 0.61 g of the catalyst having undergone preliminary polymerization prepared in Example 5 was used and 8 ml of hexene was added to an autoclave which had been purged with ethylene gas to conduct the polymerization for 2 hours. The polymer was obtained in an amount of 13.8 g, ZrY being 31,000.

Example 7

Preparation of the Catalyst

Into a 300 ml flask which had been fully purged with nitrogen, 3.55 g of silica ("AEROSIL 200", 0.012 μ, Sa/Sc=1.0, manufactured by NIPPON AEROSIL) was fed, and then 12.4 ml of a solution of triisobutylaluminum in toluene (manufactured by TOSO-AKZO, Japan, an Al content of 21.8 g/liter) was fed dropwise with 35 mg of bis(n-butylcyclopentadienyl)zirconium dichloride and 92.5 mg of dimethylanilinium tetrakispentafluorophenylborate which had been dissolved in the solution of the triisobutylaluminum in toluene with stirring over 2 minutes at room temperature. The solution was stirred for further 5 minutes whereby a fluid or free-flowing powder catalyst of an angle of repose of 55° was obtained. By this procedure, 15.1 g of the catalyst was prepared.

Polymerization

Into a 1.5 liter stainless steel autoclave (made of SUS stainless steel) which had been fully purged with nitrogen at 70° C., a mixture of 70 g of polypropylene powder and 0.79 g of the catalyst prepared above was introduced, and then triisobutylaluminum in an amount of 13.6 mg based on Al was introduced. The autoclave was purged with ethylene gas, and 50 ml of hydrogen and ethylene gas were immediately introduced to initiate polymerization at a total pressure of 7 Kg/cm²·G. Only ethylene gas was then supplied to maintain the total pressure at 7 Kg/cm²·G and the polymerization was conducted for 20 minutes. As a result, 32.9 g of a polymer (ZrY80000) was obtained.

What is claimed is:

1. A powder catalyst composition which comprises fine particles of Component (B), which is a solution or dispersion in a hydrocarbon of a Sub-component (i) which is a compound of a transition metal belonging to the IVB Group of the Periodic Table and a Sub-component (ii) which is an alumoxane, a Lewis acid, or an ionic compound which can convert the Sub-component (i) upon reaction therewith into a cation, coated with Component (A), which is an inorganic compound in the form of fine particles comprising mainly an inorganic oxide and having an average particle diameter of from 0.005 to 0.4 μm, in a weight ratio of the Component (A) to the Component (B) of from 15:85 to 40:60, wherein said powder catalyst has an angle of repose of 35° to 60°.

2. The powder catalyst composition as claimed in claim 1, wherein the inorganic oxide for the Component (A) is selected from the group consisting of $SiO_2$, $Al_2O_3$ and $ZrO_2$, as its main component.

3. The powder catalyst composition as claimed in claim 2, wherein the inorganic oxide consists essentially of $SiO_2$.

4. The powder catalyst composition as claimed in claim 1, wherein the compound of a transition metal as the Sub-component (i) is represented by the formula:

$$Q_a(C_5H_{5-a-b}R^1{}_b)(C_5H_{5-a-c}R^2{}_c)MeXY, \text{ or}$$

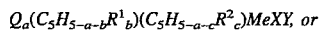

$$A_d(C_5H_{5-d-e}R^3{}_e)(R^4{}_{2-d}l)MeXY,$$

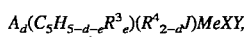

wherein $(C_5H_{5-a-b}R^1{}_b)$, $(C_5H_{5-a-c}R^2{}_c)$ and $(C_5H_{5-d-e}R^3{}_e)$, respectively, represent a conjugated five-membered ring ligand which coordinates with a metal Me in which $R^1$, $R^2$ and $R^3$ represent, respectively, a monovalent group selected from the group consisting of a hydrocarbyl group having 1–20 carbon atoms, a halogen atom, an alkoxy group having 1–12 carbon atoms, a silicon-containing hydrocarbyl group having 1–24 carbon atoms, a phosphorus-containing hydrocarbyl group having 1–18 carbon atoms, a nitrogen-containing hydrocarbyl group having 1–18 carbon atoms and a boron-containing hydrocarbyl group having 1–18 carbon atoms, $R^4$ represents a monovalent group selected from the group consisting of a hydrocarbyl group having 1–20 carbon atoms, a silicon-containing hydrocarbyl group having 1–24 carbon atoms and an oxygen-containing hydrocarbyl group having 1–20 carbon atoms, wherein $R^1$ and $R^2$ may be the same or different, or $R^1$s, if present in plurality, may be the same or different or may or may not be bonded at their free terminus, and $R^2$ (or $R^3$), if present in plurality, may be the same or different or may or may not be bonded together at their free terminus;

Q represents a divalent bridge group which crosslinks the two conjugated five-membered ring ligands indicated;

A represents a divalent bridge group which crosslinks the groups indicated, viz. $(C_5H_{5-d-e}R^3_e)$ and $(R^4_{2-d}J)$, in which J represents a nitrogen or phosphorus atom which bonds to Me;

Me represents a transition metal of the IVB group in the Periodic Table;

X and Y, which may be the same or different, each represents a monovalent group consisting of a hydrogen atom, a halogen atom, a hydrocarbyl group having 1–20 atoms, an alkoxy group having 1–20 carbon atoms, an amino group which may or may not be substituted with up to two hydrocarbyl group having 1–20 carbon atoms, a phosphorus-containing hydrocarbyl group having 1–20 carbon atoms and a silicon-containing hydrocarbyl group having 1–20 carbon atoms, respectively;

a and d denote 0 or 1;

b and c denote integers defined as $0 \leq b \leq 5$ and $0 \leq c \leq 5$, respectively, when a denotes 0, and b and c denote integers defined as $0 \leq b \leq 4$ and $0 \leq c \leq 4$, respectively, when a denotes 1;

e denotes an integer defined as $0 \leq e \leq 5$ when d denotes 0 and an integer defined as $0 \leq e \leq 4$ when d denotes 1.

5. The powder catalyst composition as claimed in claim 4, wherein Sub-component (i) is a compound of the formula:

$$Q_a(C_5H_{5-a-b}R^1_b)(C_5H_{5-a-c}R^2_c)MeXY$$

where a is 1, Q is a bridge selected from the group consisting of an alkylene group having up to 3 carbon atoms in its shortest chain and a silylene group having up to 3 silicon atom in its shortest chain, Me is selected from the group consisting of Ti, Zr and Hf, $(C_6H_{5-a-b}R^1_b)$ and $(C_5H_{5-a-c}R^2_c)$ are selected from the group consisting of a cyclopentadienyl group, an indenyl group, a tetrahydroindenyl group, a fluorenyl group and those groups substituted with at least one lower alkyl group, and each of X and Y is selected from the group consisting of a halogen atom and a hydrocarbyl group of 1 to 4 carbon atoms.

6. The powder catalyst component as claimed in claim 4, wherein Sub-component (i) is a compound of the formula:

$$Q_a(C_5H_{5-a-b}R^1_b)(C_5H_{5-a-c}R^2_c)MeXY$$

where a is 0, Me is selected from the group consisting of Ti, Zr and Hf, $(C_6H_{5-a-b}R^1_b)$ and $(C_5H_{5-a-c}R^2_c)$ are selected from the group consisting of a cyclopentadienyl group, an indenyl group, a tetrahydroindenyl group, a fluorenyl group and those groups substituted with at least one lower alkyl group, and each of X and Y is selected from the group consisting of a halogen atom and a hydrocarbyl group of 1 to 4 carbon atoms.

7. The powder catalyst component as claimed in claim 4, wherein the Sub-component (i) is a compound of the formula:

$$A_d(C_5H_{5-d-e}R^3_e)(R^4_{2-d}J)MeXY$$

where d is 1, $R^4$ is a monovalent hydrocarbyl group having 1 to 12 carbon atoms; J is a nitrogen or a phosphorus atom; Me is selected from the group consisting of Ti, Zr and Hf; $(C_5H_{5-d-e}R^3_e)$ is selected from the group consisting of a cyclopentadienyl group, an indenyl group, a tetrahydroindenyl group, a fluorenyl group and those groups substituted with at least one lower alkyl group; A is a bridge selected from the group consisting of an alkylene group having up to 3 carbon atoms in its shortest chain and a silylene group having up to 3 silicon atom in its shortest chain; and each of X and Y is selected from the group consisting of a halogen atom and a hydrocarbyl group of 1 to 4 carbon atoms.

8. The powder catalyst composition as claimed in claim 1, wherein the Sub-component (ii) is an alumoxane.

9. The powder catalyst composition as claimed in claim 1, wherein the Sub-component (ii) is a combination of a Lewis acid with an alumoxane or a trialkylaluminum.

10. The powder catalyst composition as claimed in claim 1, wherein the Sub-component (ii) is a combination of an ionic compound which can convert the Sub-component (i) upon reaction therewith into a cation with an alumoxane or a trialkylaluminum.

11. The powder catalyst composition as claimed in claim 1, which has undergone preliminary polymerization by means of gas-phase polymerization wherein the composition is contacted with an olefin at a temperature of −20° to 70° C. thereby to polymerize the olefin in an amount of 0.5 to 100 g polyolefin per gram of the powder catalyst composition from which the amount of the hydrocarbon for the Component (B) is subtracted.

* * * * *